United States Patent [19]

Leonard

[11] Patent Number: 5,203,844
[45] Date of Patent: Apr. 20, 1993

[54] MULTIPLE PAYLOAD/FAILURE MODE LAUNCH VEHICLES

[76] Inventor: Byron P. Leonard, 13700 Tahiti Way, Marina Del Rey, Calif. 90292

[21] Appl. No.: 675,644

[22] Filed: Mar. 27, 1991

Related U.S. Application Data

[63] Continuation-in-part of Ser. No. 472,096, Jan. 30, 1990, Pat. No. 5,143,328, which is a continuation-in-part of Ser. No. 417,278, Oct. 5, 1989, Pat. No. 5,129,602, and a continuation-in-part of Ser. No. 417,736, Oct. 5, 1989, Pat. No. 5,141,181.

[51] Int. Cl.$^5$ .............................................. B64G 1/00
[52] U.S. Cl. ................................. 244/158 R; 244/160
[58] Field of Search .................... 244/158 R, 160, 162; 102/377, 378

[56] References Cited

U.S. PATENT DOCUMENTS

| | | | |
|---|---|---|---|
| 3,369,771 | 2/1968 | Walley et al. | 244/158 R |
| 3,652,042 | 3/1972 | Welther | 244/158 R |
| 4,096,802 | 6/1978 | Waln | 102/378 |
| 4,451,017 | 5/1984 | Marshall | 244/172 |
| 4,834,324 | 5/1989 | Criswell | 244/160 |

OTHER PUBLICATIONS

*Overlapping Stage Burn for Multistage Launch Vehicles,* Daniels et al., Apr. 19, 1990, whole document.
*An Approach to Economic Space Transportation,* Smith, Jun. 1966, pp. 20, 25–30.
*Ruptured Solid Rocket Motor Caused Challenger Accident,* Aviation Week and Space Technology, Feb. 10, 1986, pp. 19–21.
*Marshall Officials Review Data for Solid Booster Anomalies,* Aviation Week and Space Technology, Feb. 17, 1986, pp. 100–101.
*Titan III Commercial Launch Services,* Martin Marietta Apr. 1987, whole document.

*Primary Examiner*—Barefoot, Galen L.
*Assistant Examiner*—Anne E. Bidwell
*Attorney, Agent, or Firm*—Spensley, Horn, Jubas & Lubitz

[57] ABSTRACT

A space launch vehicle having two or more specified benign failure modes and associated payload performances capable of launching two or more payloads to one or more mission orbits. When the vehicle benign failure mode yielding the highest vehicle performance occurs all of the payloads are placed in orbit successfully. When a lower performance benign failure mode occurs one or more of the payloads is jettisoned early in the launch trajectory enabling the other payload(s) to be placed in mission orbit(s) successfully. Thus, the maximum specified performance capability of the vehicle is achieved for most of its launches and that performance is reduced only when a specified benign failure occurs that leads to jettisoning a payload(s) to enable the remaining payload(s) to be placed in mission orbit(s) successfully. An interstage propellant transfer system between liquid propellant, multi-engine stages provides increased performance and numbers of benign failure modes which can occur and still achieve mission success. Each failure mode has a different probability of occurring, thus providing the flexibility of optimizing the costs of launch, payload and payload loss.

41 Claims, 7 Drawing Sheets

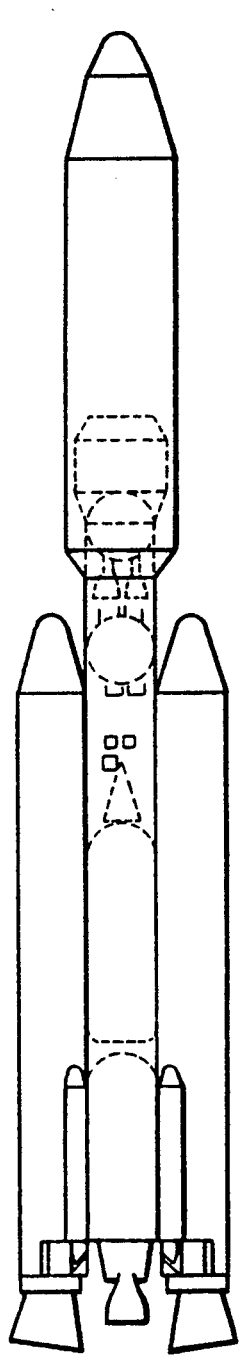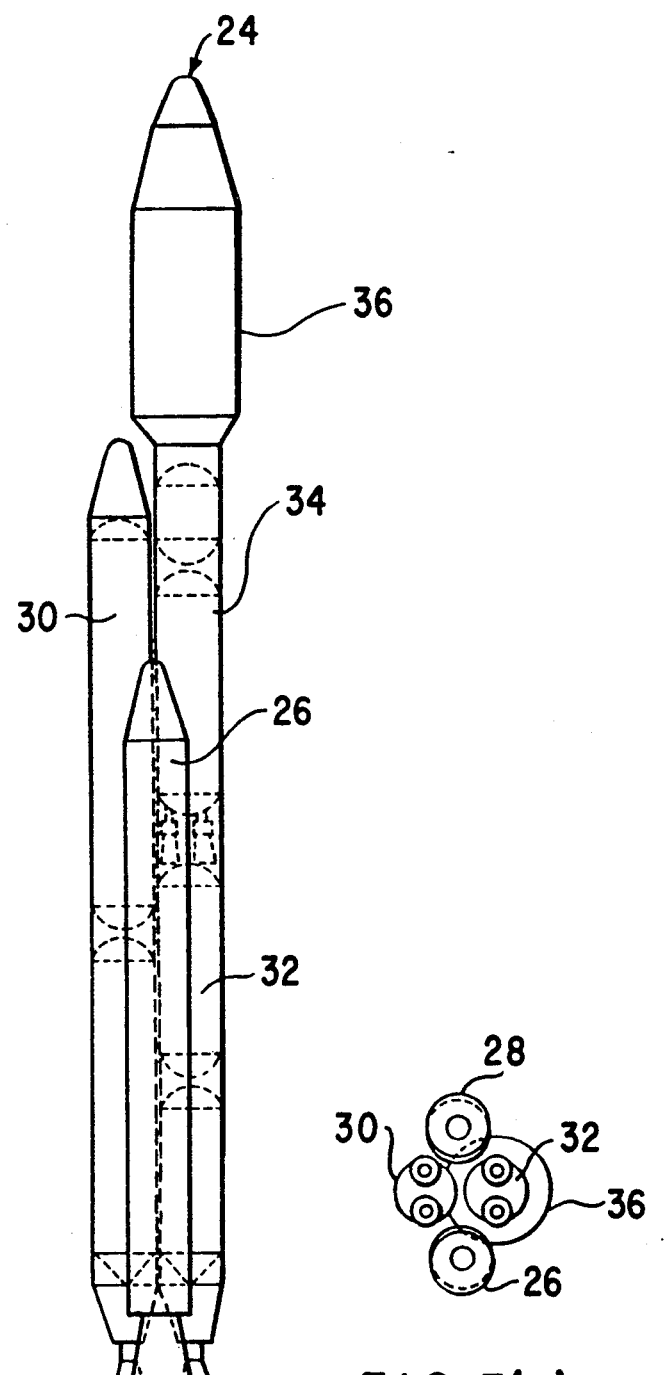
FIG. 3(a) (PRIOR ART)
FIG. 3(b)
FIG. 3(c)

MULTIPLE PAYLOAD/FAILURE MODE LAUNCH VEHICLES

CROSS REFERENCE TO RELATED APPLICATIONS

This application is a continuation-in-part of application Ser. No. 07/472,096, now U.S. Pat. No. 5,143,328, filed Jan. 30, 1990 for "Launch Vehicle With Reconfigurable Interstage Propellant Manifolding and Solid Rocket Boosters" which, in turn, is a continuation-in-part of (1) application Ser. No. 07/417,278, now U.S. Pat. No. 5,129,602, filed Oct. 5, 1989, for "Multistage Launch Vehicle Employing Interstage Propellant and Redundant Staging" and (2) application Ser. No. 07/417,736, now U.S. Pat. No. 5,141,181, filed Oct. 5, 1989, for "Improved Launch Vehicle With Interstage Propellant Manifolding."

BACKGROUND OF THE INVENTION

1. Field of the Invention

The present invention relates to launch vehicles. In particular, the present invention relates to multi-stage launch vehicles which are capable of launching manned or unmanned payloads into Earth orbit.

2. Description of Prior Art and Related Information

The various approaches to launch vehicle design may be generally classified into single stage or multi-stage launch vehicle systems. Single stage launch vehicles employ a single thruster stage which includes all the propellant required to deliver a specified velocity to the payload. Since considerable mass is contained in the propellant tanks, engines and thrust structure, which mass becomes unnecessary once propellant therein is expended, a single stage launch vehicle is inherently of less than optimum efficiency. Multi-stage launch vehicles, where an entire stage, including propellant tanks and engines, is jettisoned after propellant expenditure, have accordingly been developed and gained predominance for earth orbit launch applications.

A Titan IV vehicle, 2 illustrated in FIG. 1 is an example of the current multi-stage launch vehicle art. It can be flown as a three or four stage launch vehicle for space missions in Low Earth Orbit (LEO), or Geosynchronous (GEO) and Geosynchronous Transfer (GTO) Orbits. The first stage consists of two uprated solid rocket motor (SRMU) boosters 4 and 6 "strapped-on" to the second and third liquid propellant stages, 8 and 10. The three stages operate in series, i.e. the thrust of each stage is initiated after previous thrusting stages have expended their propellants and been staged. For GEO missions, the fourth stage 12 is a modified Centaur stage propelled by two $LO_2/LH_2$ (liquid oxygen/liquid hydrogen) cryogenic engines.

The Titan IV vehicle 2, will fail to perform its mission successfully if either of two categories of failures occur in the vehicle; 1) a catastrophic failure which destroys the vehicle, or 2) a benign failure, which does not destroy the vehicle, but causes its performance to be degraded so that it does not deliver the required velocity to the payload to place it in its mission orbit.

The Shuttle Launch Vehicle 14 illustrated in FIG. 2, is another example of the current art. The Shuttle is a two stage vehicle with two solid rocket boosters (SRBs), 16 and 18, comprising the first stage. A second stage is propelled by a propulsion module 20 comprised of three space systems main engines (SSMEs), mounted in an orbiter vehicle 21, burning liquid propellants ($LO_2/LH_2$) from a single External Tank 22 (ET). Should an SSME fail benignly, i.e., not in a manner which would destroy the vehicle, the Shuttle is designed to enter an abort mode which has a high probability of saving its payload and the orbiter 21 and its crew, but a low probability of placing the payload in its mission orbit. Thus, current multi-stage launch vehicles are limited to having an engine-out capability in a single liquid stage to provide an enhanced probability of preserving a high value payload, and the manned space craft and its crew.

The reason that the application of an engine-out capability in a liquid stage has been limited to the case of the Shuttle is largely economic, i.e., in order that a vehicle perform its mission successfully in spite of loss in performance due to a benign engine failure, it must be launched with a lower payload weight than for the case of all engines thrusting. Thus, the economics of placing payloads into space orbits have mitigated against the use of engine-out capabilities except in the extraordinary case of reducing the probability of loss of the high value payload and the orbiter and its crew.

A detailed review of the in-flight history of U.S. space launch vehicles reveals that most of the failures have been due to inadequate thrust of their propulsion systems. Furthermore, it can be shown that the preponderance of the failures which caused the reduction in thrust were benign in the sense that they didn't cause the destruction of the launch vehicle but caused a loss in velocity delivered to the vehicle thereby failing to deliver the payload to the prescribed mission orbit. Most often this resulted in the payload receiving a velocity less than that required to place it in Earth orbit causing its return to Earth with destruction on impact. Accordingly, there presently exists a need to improve launch vehicle mission failure probability (reliability), payload performance, and economics in spite of benign failures in the vehicle.

SUMMARY OF THE INVENTION

The present invention provides a launch vehicle which is capable of providing mission success for specified payload weights even with degraded vehicle performance resulting from specified benign failures in the vehicle.

The present invention provides a multi-stage launch vehicle having multiple payloads and means for jettisoning one or more of the payloads in response to a benign failure in one of the stages. For example, a preferred embodiment of the present invention provides a multi-stage launch vehicle which can place three payloads, two payloads, or one payload in orbit depending upon which of three prescribed benign failure modes occur: 1) no vehicle failure; 2) an engine in a multi-engine stage fails (benignly) to thrust at vehicle liftoff; or 3) a multi engine stage propulsion system fails (benignly) to thrust at vehicle liftoff. Failure modes 1)-3) are in the order of decreasing payload performance to a given mission orbit and decreasing vehicle failure probability. To provide this capability, the launch vehicle of the present invention employs primary, secondary and tertiary payloads of approximate weights W1, W2 and W3 respectively, where the vehicle performance for the three failure modes defined above is, 1) W1+W2+W3, 2) W1+W2, and 3) W1 respectively. Thus, when no vehicle failure occurs all three payloads are placed in orbit successfully. Alternatively, when failure mode 2)

occurs the tertiary payload W3 is jettisoned early in the launch trajectory enabling the placement of the primary and secondary payloads in orbit successfully. Finally, when failure mode 3) occurs, the secondary and tertiary payloads are both jettisoned early enabling the placement of the primary payload in orbit successfully.

It will be appreciated that other combinations of primary and secondary payloads associated with the three failure modes may be launched. Additionally, a primary and a secondary payload may be placed in different mission orbits. It will be further appreciated that, depending upon the launch vehicle characteristics, other benign failures may be specified for multi-engine multi-stage launch vehicles, e.g. two engines failing to thrust in a stage at liftoff, which has more than two engines.

Accordingly, the present invention provides a multi-stage launch vehicle, with one or more of the stages having specified benign failure modes, having the capability to place one or more payloads in orbit even if a benign failure mode occurs during a launch. Furthermore, the launch vehicle of the present invention has the capability to place the full payload weight into orbit assuming no vehicle failure occurs, with the total payload capability being reduced only if one of the specified vehicle benign failures occurs during a particular launch. Accordingly, the multiple payload launch vehicle of the present invention will not be operated at a reduced performance and economic level in anticipation of a failure which occurs only infrequently, and will experience a reduction in payload weight placed in orbit only when a specified benign failure actually occurs.

It will be appreciated that the specified vehicle benign failure modes will have differences in probabilities of occurrences. Accordingly it can be expected that payloads with high and low economic and operational values will be associated with low and high probability failure modes respectively. An example is a high value spacecraft and its low value propellants launched as separate payloads for subsequent operations in space.

Further features and advantages of the present invention will be appreciated by review of the following detailed description of the presently preferred embodiments of the present invention.

BRIEF DESCRIPTION OF THE DRAWINGS

FIG. 3(a) is a side view of a prior art Titan IV launch vehicle.

FIGS. 3(b) and 3(c) are a side view and a top view, respectively, of a preferred embodiment of the launch vehicle of the present invention.

DETAILED DESCRIPTION OF THE INVENTION

Figure 1:
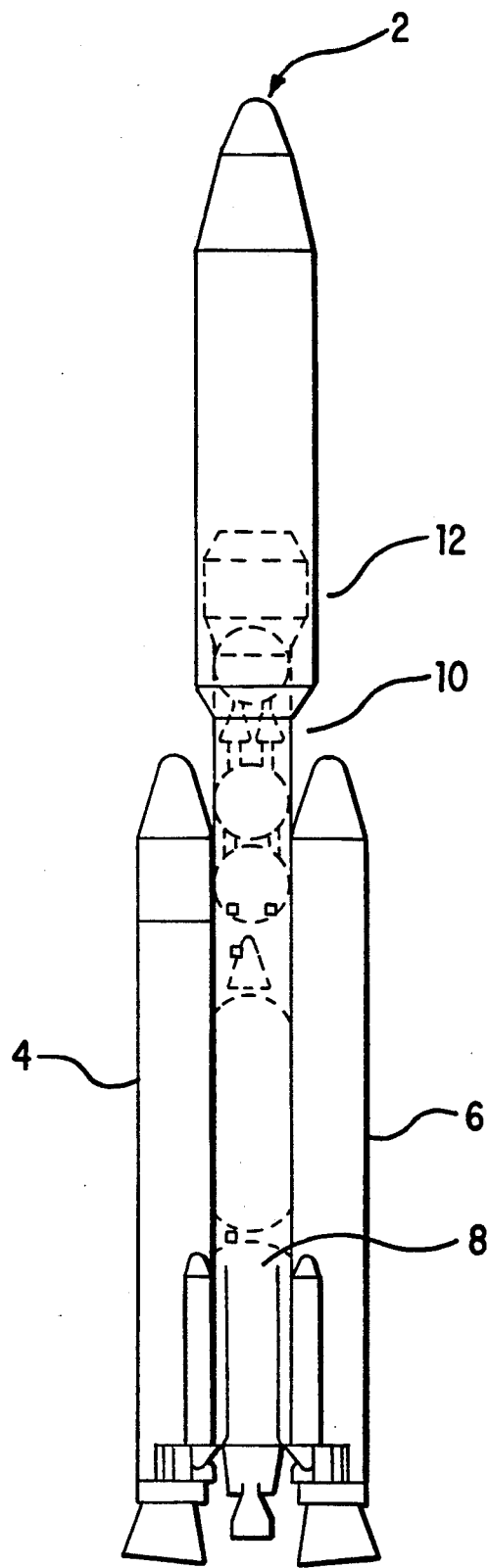
FIG. 1 is a side view of a prior art multi-stage Titan IV launch vehicle.
Figure 2:
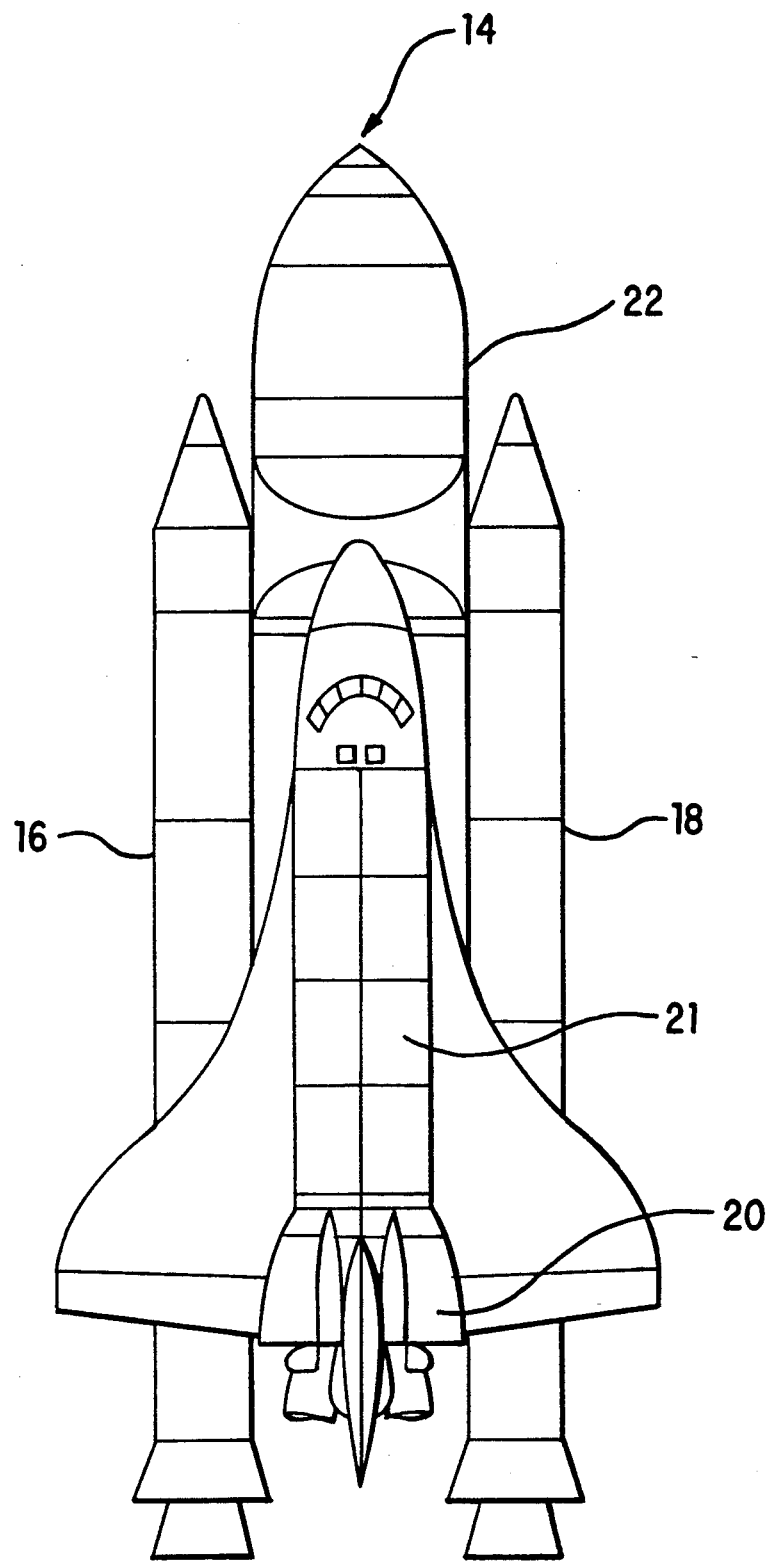
FIG. 2 is a side view of a prior art Shuttle Launch Vehicle.

FIGS. 3(b) and 3(c) illustrate an improved launch vehicle 24 in accordance with the present invention in side and top views, respectively. For illustrative purposes, launch vehicle 24 is shown based on a Titan IV type launch vehicle. However, it will be appreciated that the improved multiple payload launch vehicle of the present invention may be employed with other existing designs for launch vehicle stages or with new vehicle stages. A conventional Titan IV having a Centaur upper stage is shown in FIG. 3(a) for comparison.

Launch vehicle 24, as illustrated in FIGS. 3(b) and 3(c), is a four stage vehicle. As used herein, the term "stage" refers to the structural portion or portions of the launch vehicle which are staged, i.e. jettisoned at some time during the launch vehicle trajectory. The launch vehicle 24 utilizes two Titan Solid Rocket Motors Upgraded (SRMUs) 26 and 28 as the first stage, burning in parallel with second and third stages 30 and 32, respectively, each of which is a modified Titan liquid stage with two engines. Launch vehicle 24 employs a modified Centaur 34 for the upper stage in the central vehicle stack, which burns in series with the third stage 32. The modified Centaur 34 may preferably be propelled by two, up rated RL-10 engines with an Isp of 460 seconds and 34,000 lbf. thrust per engine.

Although the improved launch vehicle 24 carries more liquid propellant than does the Titan IV vehicle, its core, stages three 32 and four 34 and the payload aerodynamic fairing 36, are no longer than that of Titan IV. This is possible because the second stage 30 of the improved vehicle 24 carries all of the propellant burned by both second and third stages 30 and 32 during their parallel burn. This is made possible by supplying propellant through an interstage propellant manifold (illustrated in FIG. 4) from second stage 30 only, to the engines of both second and third stages 30 and 32 during their parallel burn. Therefore, the third stage 30 carries only the propellant it must burn after staging of second stage 30. Thus the overall length and weight of third and fourth stages is minimized, with a corresponding increase in stage stiffness and payload performance.

The launch vehicle 24 is stiffened during the parallel burn of stages two 30 and three 32 by a number of interstage structural load carrying and separation attachments (not shown). These may take the form of explosive bolts or other releasable rigid coupling mechanisms. As noted above, and as will be discussed in more detail below in relation to FIG. 4, interstage propellant manifolding is employed between stages 30 and 32. As a result, the end of the second burn of the vehicle 24 occurs at an altitude above that where high altitude winds present a problem. Thus, the high altitude winds will not be a major limitation on launch vehicle availability.

Figure 4:
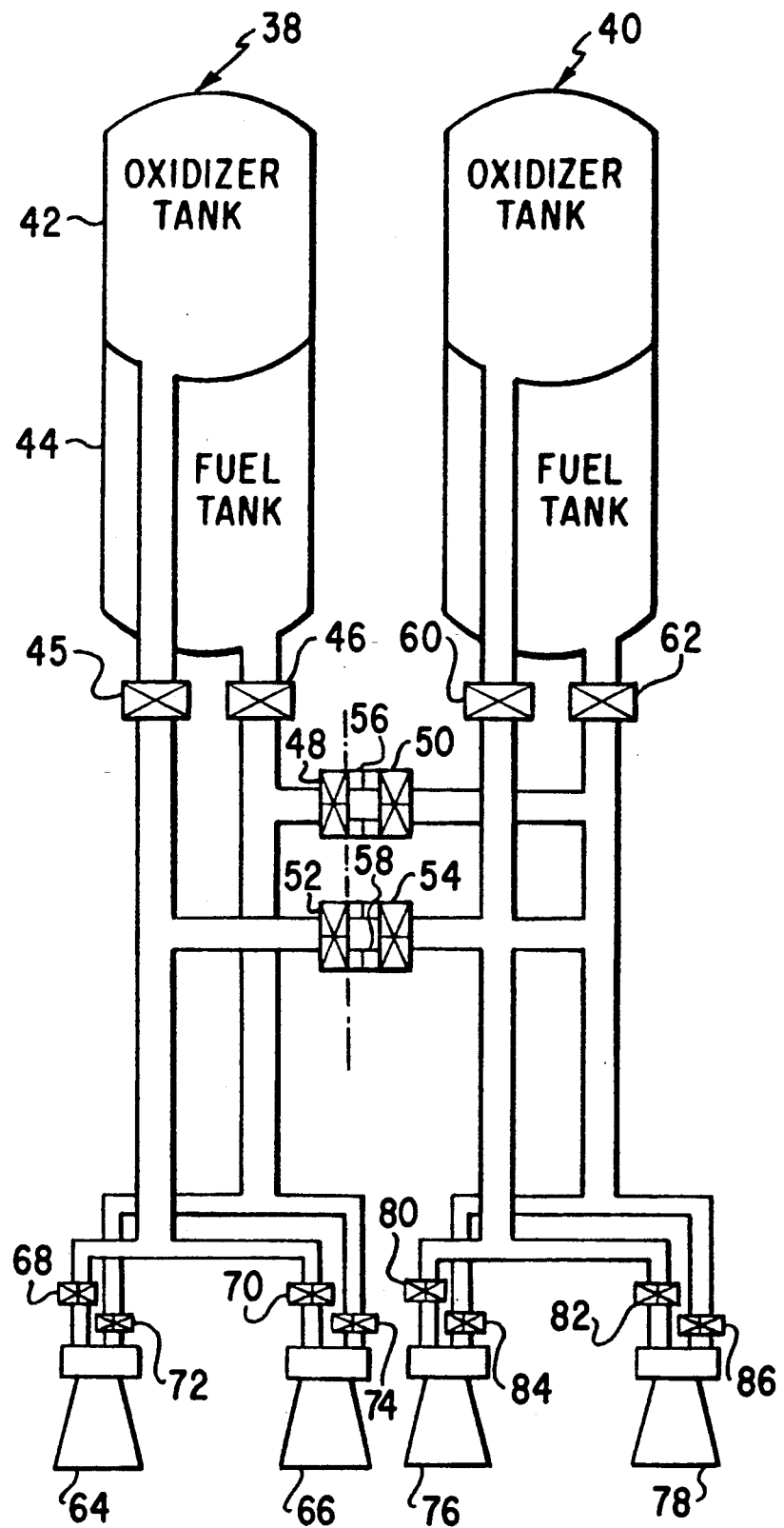
FIG. 4 is a cross-sectional schematic drawing of an interstage propellant manifolding system employed in a preferred embodiment of the present invention.

Referring to FIG. 4, a preferred embodiment of the interstage propellant transfer system between the parallel burn liquid stages 30 and 32 is illustrated in a cross-sectional schematic view. In a preferred embodiment, propellant utilization by both stage 30 and 32 engines from second stage 30 propellant tanks is achieved by a manifold structure interconnecting the parallel stages 30 and 32 in the vehicle. It will be appreciated that several forms of interstage propellant transfer may also be employed, including passive transfer and active pumping systems. Referring to FIG. 4, the propellant tanks 38 and 40 for second stage 30 and third stage 32, respectively, are shown, each of which includes an oxidizer tank and a fuel tank. The oxidizer tank 42 and fuel tank 44 of second stage 30 are manifolded through second stage outlet valves 45 and 46 through pairs of manifold valves 48, 50 and 52, 54 which are required to optionally burn propellant from second stage 30 or third stage 32, first. As will be discussed below, this optional propellant utilization ability allows for higher vehicle performance, and, in response to benign engine and stage thrusting failure modes, the provision of redundant stages and increased reliability. Associated with the manifold valves 48, 50, 52 and 54 are quick disconnects 56 and 58 which permit separation of the two stages at any time. Third stage propellant tanks 40 have oxidizer and fuel outlet valves 60, 62 similar to those of second stage tanks 38. The second stage 30 has two engines 64, 66 which have oxidizer inlet valves 68 and 70 and fuel inlet valves 72 and 74. The third stage 32 also has two engines 76 and 78 which have oxidizer inlet valves 80 and 82 and fuel inlet valves 84 and 86.

The operation sequence of the interstage manifolding will next be described for a nominal launch. Starting with lift off, all valves are open except third stage outlet valves 60 and 62. Thus during the parallel burn of second stage 30 and third stage 32 all engines are utilizing propellants only from the second stage tanks 38. To initiate staging of the second stage at the end of its burn, valve changes and disconnect activations are, in rapid sequence, as follows:

1) Open third stage tank outlet valves 60 and 62.
(2) Close all second stage engine inlet valves 68, 70, 72 and 74.
(3) Close manifold valves 48, 50, 52 and 54.
(4) Close stage two outlet valves 45 and 46.
(5) Activate disconnects 56 and 58.

As noted above, the sequence provides the desired propellant transfer during a nominal launch. Additionally, the manifolding in combination with the staging capability of stages 30 and 32 can provide significant reliability increases. This may be appreciated from consideration of several launch scenarios and the appropriate manifolding and staging sequence for each scenario which are briefly discussed below.

One stage failure scenario is for stage two 30 to experience a failure that causes loss of thrust of that stage at lift off. In this case the second stage engine inlet valves 68, 70, 72 and 74 would be closed with all other manifold valves remaining set for nominal operation at liftoff. In this configuration, stage three engines would burn the propellant from stage two tanks 42 and 44 only. Upon approaching stage two propellant depletion, the nominal valve sequencing to staging the second stage would be initiated. Subsequent to stage two staging, stage three would function in a nominal sequence. This has the effect of changing stage two 30 to a drop tank and three 32 to a single stage and utilizing all of the propellant from both to accommodate the loss of thrust in stage two 30.

Should the third stage 32 fail during first burn, two design options exist: jettison third stage 32 immediately or retain third stage 32, burning the stage three propellant with the stage two engines. The first option is preferable from the standpoint of vehicle reliability, in that it reduces the probability that the third stage 32 failure will propagate into other parts of the vehicle. However, for some vehicle configurations, the third stage 32 structure may be essential to the delivery of thrust loads from second stage 30 to fourth stage 34 and for providing structural stability for wind and other dynamic loads. Thus, the continuing presence of third stage 32 may be required until the burn out and staging of second stage 30. In the first option, wherein third stage 32 is jettisoned, the following actions occur in rapid sequence.

(1) Close all engine inlet valves on third stage 32, i.e., valves 80, 82, 84 and 86.
(2) Close manifold valves 48, 50, 52 and 54.
(3) Activate disconnects 56 and 58.

For the second option where third stage 32 is retained and second stage 30 engines burn all of the propellants from second stage 30 and third stage 32, the following sequence of actions is taken (to burn the propellants in third stage 32 first, followed by burning the propellants in second stage 30):

(1) Close all the engine inlet valves on third stage 32, i.e., valves 80, 82, 84, and 86.
(2) Open third stage propellant tank outlet valves 60 and 62.
(3) Close second stage 30 propellant tank outlet valves 45 and 46.

This status of the manifold permits burning of propellants from third stage 32 tanks while holding propellants in second stage 30. Subsequently, just before depletion of propellant tanks in third stage 32:

(1) Open second stage propellant tank outlet valves 45 and 46.
(2) Close third stage propellant tank outlet valves 60 and 62.

Generally, the function of the interstage propellant module, in the event of the failure of stage two 30 or stage three 32 to thrust, is to reconfigure the launch vehicle from a four to a three stage or a three and one half stage (thrusting stage plus a drop tank) vehicle; i.e. operate the two stages 30 and 32 as a single, thrusting stage. When either stage 30 or 32 fails, it functions only as a set of propellant tanks thereafter. After the failure, the interstage propellant manifold is operated to manage the propellant utilization and staging sequences so as to maximize vehicle payload performance under the particular failure circumstances. In the event of a failure, the required changes in vehicle sequencing may preferably be triggered by an on-board sensing and computer system which will be described later.

In addition to providing a successful launch in the event of failure of Titan liquid stage two 30 or three 32 to thrust, the improved launch vehicle 24 in accordance with the present invention may be launched with a less conservative failure mode, i.e., one engine fails non-catastrophically (one engine-out) in either stage two or three 30 or 32. In this event the sequencing of the valves is identical to that described for a nominal launch. However, the timing is changed to accommodate the changes in propellant mass flow, associated with the engine failure.

It will be appreciated that the interstage propellant transfer capabilities described for vehicle 24 provide for great flexibility to achieve mission success in spite of benign failures in the vehicle. However, this can be achieved only by accommodating the losses in vehicle payload weight performances associated with the anticipated failure modes. Accordingly, the vehicle performance must be specified for each benign failure mode which is significant to the economic operation of the launch vehicle. For vehicle 24 a preferred embodiment of the present invention would be designed to place three, two or one payload(s) in GEO with: 1) no vehicle failure, 2) one engine fails, benignly, to thrust in stage three 32 at lift off, and 3) stage three 32 fails to thrust at lift off.

Tables 1, 2 and 3 present vehicle 24 performance data for payloads placed in Geosynchronous Orbit (GEO) with the three defined failure modes. It should be noted that for case 3, with stage three 32 failing to thrust at liftoff, the vehicle 24 is reduced from a four to a three stage vehicle, with stages two 30 and three 32 becoming a single stage.

TABLE 1

Vehicle 24 GEO Mission Weight and Performance Data With No Vehicle Failure

| | Burn Times (sec) | | | Weight (lbs) | | Engine Exit | Vacuum Thrust | Fuel Flow Rate | Specific |
|---|---|---|---|---|---|---|---|---|---|
| | Start | Time | End | Propellant | Total | (sq. in.) | LBm | (lb/sec) | Impulse |
| Burn | | | | | | | | | |
| 1 | 0 | 115 | 115 | 1323386 | 160844 | 26849 | 3300320 | 11544 | 286 |
| | 0 | 115 | 115 | 419387 | 0 | 13567 | 1103568 | 3658 | 302 |
| Fairing | | | 158 | | | | | | |
| 2 | 115 | 91 | 206 | 333542 | 36722 | 13467 | 1103568 | 3658 | 302 |
| 3 | 206 | 91 | 297 | 166771 | 10752 | 6733 | 551784 | 1829 | 302 |
| 4 | 297 | 676 | 973 | 100000 | 13360 | 2513 | 68000 | 148 | 460 |
| Liftoff | | | lbs. | | | | | | |
| Thrust | | | 3809187 | | | | | | |
| Gross Weight | | | 2602815 | | | | | | |
| Payload to GEO | | | 26000 | | | | | | |

TABLE 2

Vehicle 24 GEO Mission Weight and Performance Data With One Engine Failed in Stage Three 32 at Liftoff

| | Burn Times (sec) | | | Weight (lbs) | | Engine Exit | Vacuum Thrust | Fuel Flow Rate | Specific |
|---|---|---|---|---|---|---|---|---|---|
| | Start | Time | End | Propellant | Total | (sq. in.) | LBm | (lb/sec) | Impulse |
| Burn | | | | | | | | | |
| 1 | 0 | 115 | 115 | 1323386 | 160844 | 26849 | 3300320 | 11544 | 286 |
| | 0 | 115 | 115 | 314552 | 0 | 10100 | 827676 | 2743 | 302 |
| Fairing | | | 158 | | 10592 | | | | |
| 2 | 115 | 147 | 262 | 403432 | 36722 | 10100 | 827676 | 2743 | 302 |
| 3 | 262 | 221 | 483 | 207716 | 10572 | 3367 | 275892 | 917 | 302 |
| 4 | 483 | 676 | 1159 | 100000 | 13360 | 2513 | 68000 | 148 | 460 |
| Liftoff | | | lbs. | | | | | | |
| Thrust | | | 3582962 | | | | | | |
| Gross Weight | | | 2599641 | | | | | | |
| Payload to GEO | | | 23000 | | | | | | |

TABLE 3

Vehicle 24 GEO Mission Weight and Performance Data With Stage Three 32 Failure to Thrust at Liftoff

| | Burn Times (sec) | | | Weight (lbs) | | Engine Exit | Vacuum Thrust | Fuel Flow Rate | Specific |
|---|---|---|---|---|---|---|---|---|---|
| | Start | Time | End | Propellant | Total | (sq. in.) | LBm | (lb/sec) | Impulse |
| Burn | | | | | | | | | |
| 1 | 0 | 115 | 115 | 1323386 | 160844 | 26849 | 3300320 | 11544 | 286 |
| | 0 | 115 | 115 | 209716 | 0 | 6733 | 551784 | 1829 | 302 |
| Fairing | | | 158 | | 10592 | | | | |
| 2 | 115 | 394 | 509 | 719984 | 47474 | 6733 | 5511784 | 1829 | 302 |
| 3 | 503 | 676 | 1185 | 100000 | 13360 | 2513 | 68000 | 148 | 460 |
| Liftoff | | | lbs. | | | | | | |
| Thrust | | | 3356736 | | | | | | |
| Gross Weight | | | 2603823 | | | | | | |
| Payload to GEO | | | 14500 | | | | | | |

It will be appreciated that other benign failure modes could be specified for vehicle 24, e.g. two engines fail, benignly, to thrust in stage two 30. However, it should be noted that the specified cases are defined in order of decreasing vehicle performance where failure modes 2 and 3 are the worst case failures since they are assumed to occur in stage three 32 at liftoff which lead to the lowest vehicle performances for benign failures of an engine and stage respectively.

Figure 5A:
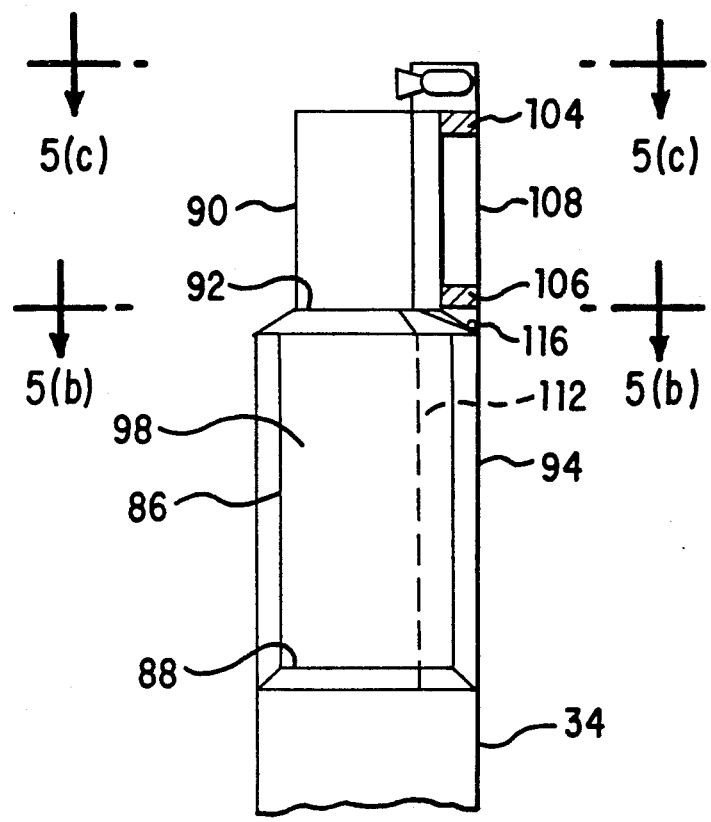
FIG. 5(a) is a side sectional view of the top portion of the launch vehicle of FIGS. 3(a)-3(c) showing the multiple payload.
Figure 5B:
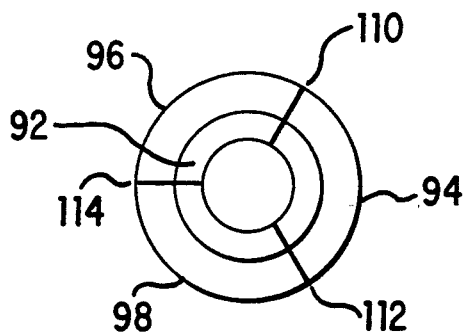
FIGS. 5(b) and 5(c) are top sectional views taken through sections A—A and B—B of FIG. 5(a), respectively.
Figure 5C:
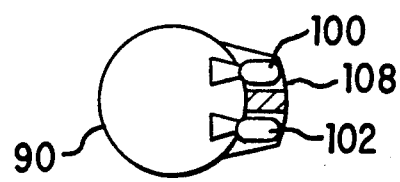

FIGS. 5(a), 5(b) and 5(c) illustrate side and top sectional views of a top portion of the vehicle 24 for a two payload embodiment of the multiple payload launch vehicle of the present invention. A primary payload 86 is mounted directly to the upper surface 88 of stage three 34 and a secondary payload 90 is mounted on the primary payload. The secondary payload is mounted on a tri-sector cylindrical payload structure 94, 96, 98 the base of which is attached to the upper surface 88 of stage three 34 with explosive bolts or other separation mechanism. The secondary payload 90 is attached to a support and separation ring 92 of the tri-sector structure, which itself has three separation devices 110, 112 and 114 on its cylindrical surface. These devices 110, 112 and 114 could be conventional linear shaped charges encapsulated in a cylindrical structure member commonly called "superzip."

The primary payload, when it has reached its mission orbit is separated from the stage three 34 by conventional means, i.e., separation bolts which release the payload 86 and separation springs which impart a velocity to the payload 86 directed away from the stage three 34. This occurs after the secondary payload 90 has been separated from the primary payload 86 by its support and separation structure.

The advantages of the multiple payload launch vehicle of the present invention may be best appreciated by consideration of specific examples of mission failure scenarios in accordance with the preferred embodiment of the present invention illustrated in FIGS. 3(b), 3(c) and 5(a)-5(c).

Because the results of a particular launch are probabilistic in nature, the choice of launching a single payload weight assuming a particular benign failure will occur is economically unattractive. This is true since, in the event an assumed benign failure doesn't occur on that launch, the vehicle would have been capable of placing a larger payload in orbit. On the other hand, if the payload weight is set assuming that the benign failure will not occur, and the failure does occur, the mission fails and the payload is lost. The present invention removes the need to make economic choices between these extremes.

This is accomplished in the present invention by defining and launching more than one payload associated with more than one specified benign failure mode. A simple example would be to launch two GEO payloads on vehicle 24 associated with its failure modes 1 and 2, i.e., no vehicle failure and one engine fails in stage three 32 at lift-off. The two payloads, obtained by using values from Tables 2 and 1, would weigh approximately 23,000 lbs and 26,000−23,000=3000 lbs, respectively, i.e., the performance capability of vehicle 24 if failure mode 2 occurs and the difference in vehicle 24 performances for failure modes 1 and 2. Thus, the sum of the two payloads would equal the vehicle 24 performance if failure mode 1 occurs. Accordingly, if no vehicle failure occurred (failure mode 1), both payloads would be placed in GEO successfully. However, if failure mode 2 occurred, the 3000 lb payload would be jettisoned, enabling the placement of the 23,000 pound into GEO successfully. Thus the two payloads associated with those failure modes may be designated primary and secondary because of the possibility that the latter would be jettisoned. The vehicle 24 weight and performance data for this multiple payload launch is identical to Table 2 with one exception. Because of the engine failure, the secondary payload has been jettisoned at the time of payload fairing separation. Thus, the weight staged at the time of fairing separation is increased by the weight of the secondary payload plus approximately 1000 pounds for the separation structure and devices, to approximately 14,592 lbs. The primary payload predicted for this case is the same as that shown in Table 2, i.e., 22,800 lbs., within the accuracy of the optimization techniques used in the calculations. If no vehicle failure occurred on that launch, both the primary and the secondary payloads would be placed in GEO. The sum of the primary and secondary weights is approximately equal to the single payload capability shown for no vehicle failure in Table 1. If failure mode 3 or a catastrophic failure occurred in vehicle 24 both payloads would be lost. Generally, it can be expected that one or more of the payload weights would be diminished by the weight of the added structure and separation mechanisms for the two payloads and the small loss in performance associated with carrying the secondary payload to the point of fairing separation when an engine fails benignly. The exact reduction in payload weight will vary with the specific implementation of the mechanisms.

A study of the history of U.S. launch vehicle failures reveals that a large fraction of the failures occurred early in the launch trajectories. Thus, a probable time for secondary payload jettisoning would be at the time of payload fairing staging after the launch vehicle has traversed the Earth's atmosphere.

Referring to FIGS. 5(a)-5(c), which illustrate the primary and secondary payloads on their mountings at a time in the launch trajectory just after the separation of the payload fairing 36 of the vehicle 24, the specific actions in response to the failure mode scenarios may be considered. Should the benign engine failure mode occur, the jettisoning sequence for secondary payload 90 would begin immediately after payload fairing 36 separation, with the simultaneous activation of explosive separation bolts attaching payload 90 to its support and separation ring 92, and ignition of small separation rockets 100 and 102. The rocket thrust acting on 108, a structural element attached by spring loaded attachments 104 and 106, to secondary payload 90, and resting on a free pivot point 116 on cylindrical sector 94, will propel secondary payload 90 away from vehicle 24 in a rotating and side ways motion.

Should no vehicle failure occur, structural element 108 is spring force ejected following separation of the payload fairing with the severance of spring loaded attachments 104 and 106 between 90 and 108. The severance of attachments 104 and 106 can be achieved by means of explosive bolts or other well known mechanisms. This permits the placement of the primary payload 86, secondary payload 90 and the tri-sector cylindrical structure 94, 96, 98 in the desired mission orbit. The secondary and then the primary payloads are separated by activating in sequence: 1) separation planes 92 for secondary payload separation from the trisector structure; 2) activating separation devices 110, 112, 114 and on plane 88 to jettison the tri-sector structure; and 3) activating separation plane 88 for the primary payload 86, thus placing the two payloads in their mission orbits.

With the specified benign failure modes, each yielding a different vehicle performance, three payloads could be launched by vehicle 24 to GEO with the approximate weights shown in Table 4. In this case the secondary and tertiary payloads can be mounted on top of the two SRMUs 26 and 28 as described later.

The vehicle 24 weight and performance data launching three payloads to GEO for the case where failure mode 2 occurs, is the same as shown in Table 2 with one exception. In this case, the weight staged at 115 seconds, the time of SRMUs 26 and 28 staging, has been increased from 160,844 to 164,844, i.e., 3000 pounds of tertiary payload plus 1000 pounds of separation structure and devices, and the primary and secondary payloads have been placed in GEO. The calculated payload weight is 22,700 lb, approximately equal to the sum of the primary and secondary payload weights. The weight and performance data for the case where failure mode 3 occurs is the same as that shown in Table 3 except for the weight staged at the time of SRMUs 26 and 28 staging, i.e., it includes the weight of both the secondary and tertiary payloads and separation structure and devices, enabling the primary payload to be placed in GEO. The primary payload calculated weight to GEO is the same as that shown in Table 4. Table 1 performance data represents the three payload launch case for failure mode 1 where all payloads are placed in GEO. Thus, for each failure mode, the sum of the payloads placed in GEO is essentially equal to the vehicle payload performance associated with that failure mode.

Figures 6A, 6B, 6C:
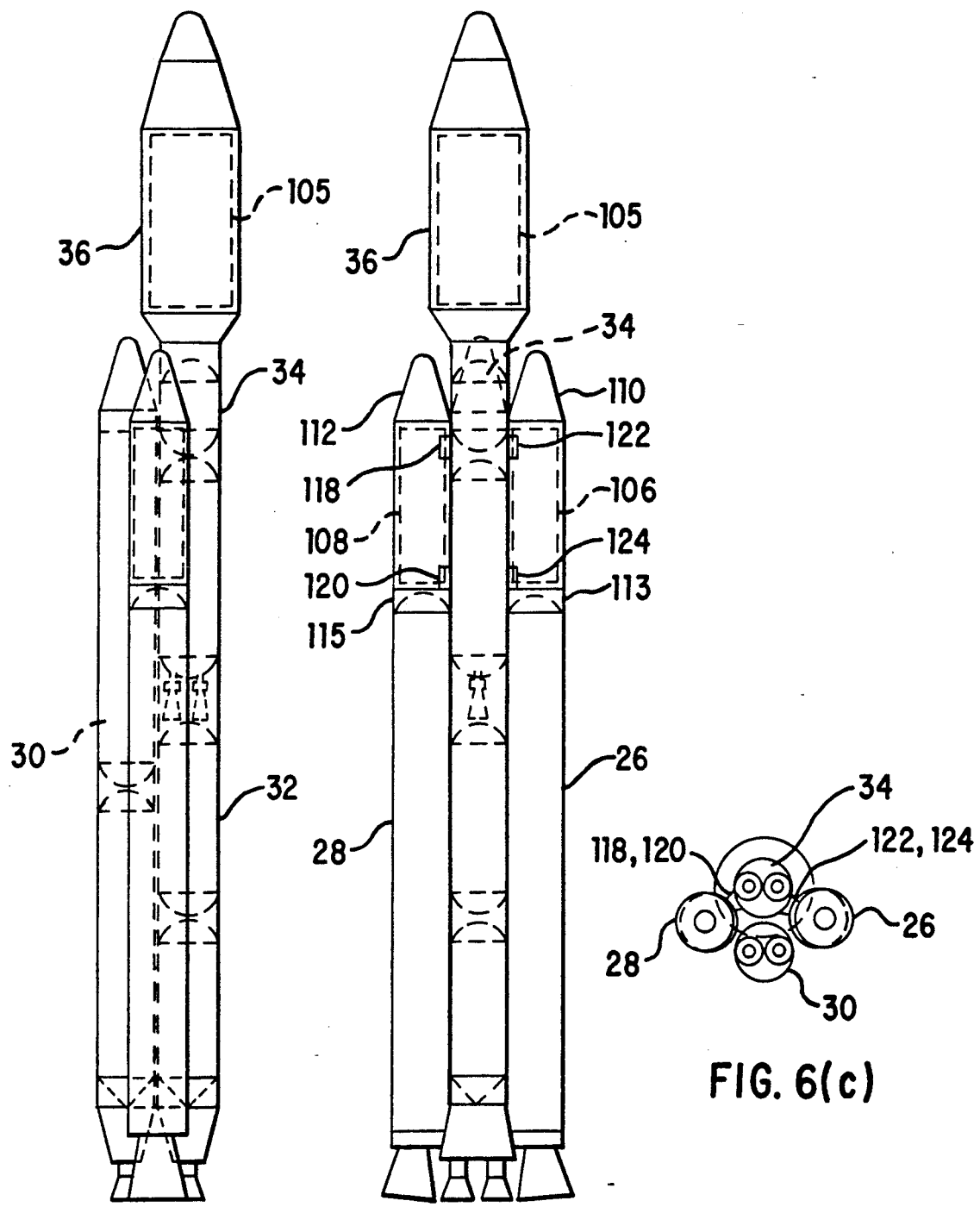
FIGS. 6(a), 6(b) and 6(c) are two side views and a top view, respectively, of an alternate embodiment of the launch vehicle of the present invention.

FIGS. 6(a), 6(b) and 6(c) illustrate an alternate embodiment of the present invention having a three-payload mounting and separation configuration. The primary payload 105 enclosed by payload fairing 36 is mounted on top of stage four 34, and the secondary and tertiary payloads 106 and 108 are preferably mounted on top of SRMUs 26 and 28, respectively. The secondary and tertiary payloads are each protected by separate payload enclosures 110 and 112.

For the secondary payload 106, if no vehicle failure occurs an interface structural section 113 between the secondary payload 106 and SRMU 26 is jettisoned after release by explosive bolts or a similar mechanism and would separate the secondary payload 106 from the SRMU 26 before SRMU separation from launch vehicle 24, leaving the secondary payload attached to stage four 34. Structural attachment and explosive separation devices 122 and 124 on stage four 34 would provide for subsequent rocket thrust loads and separation of payload 106 from stage four 34.

Should failure mode 3 occur, necessitating jettisoning of secondary payload 106, the explosive devices at attachment points 122 and 124 would be command activated immediately before SRMU separation and payload 106 would be separated attached to SRMU 26.

For the tertiary payload 108, the attachment and separation mechanisms and procedures employed may be identical to those described for the secondary payload 106.

Figure 7:
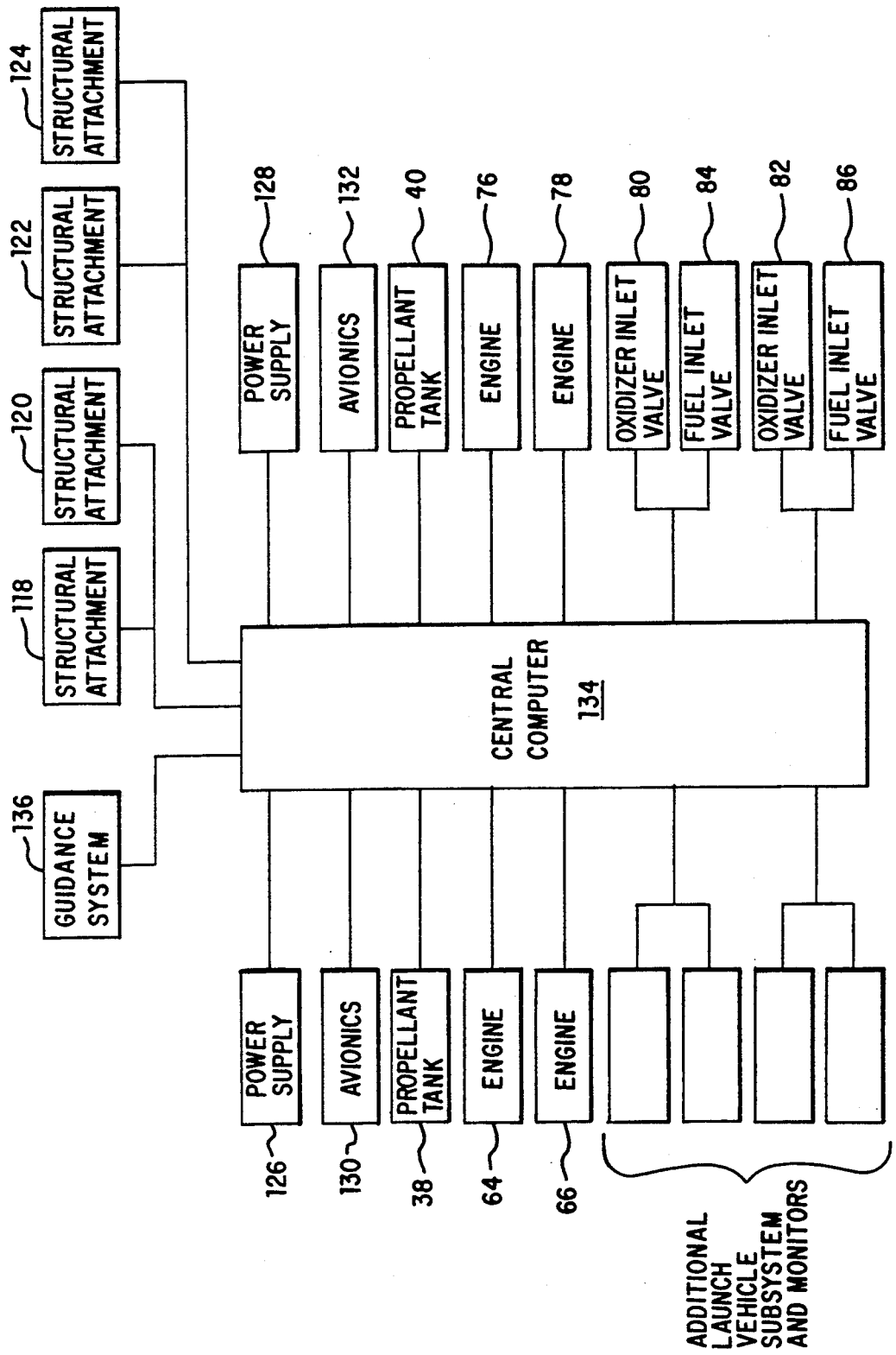
FIG. 7 is a block diagram of the on board launch vehicle control system employed in a preferred embodiment of the present invention.

FIG. 7 illustrates, schematically, an on-board system designed to sense the occurrence of benign failure modes and when necessary, reconfigure vehicle 24, including jettisoning of the tertiary and possibly secondary payloads, to ensure the successful placement of the remaining payload(s) in the mission orbit(s). The sensing system senses critical operating parameters of the major subsystems in stages two 30 and three 32. The subsystems and parameters to be sensed by the sensors are: 1) power supplies 126 and 128; voltages, currents and temperatures, 2) avionics, 130 and 132; voltages, currents and discrete signals, 3) propellant tanks 38 and 40; pressures, 5) engines, 64 and 66, and 76 and 78, including actuators, controls and propellant feed lines; pressures, temperatures and vibrations.

The various sensors would be connected electronically to the central computer 134 which would monitor the parameters' values to detect, 1) a specified benign failure, or 2) anomalous operations that could lead to a specified benign or a catastrophic failure. In either case the computer would issue the necessary commands to reconfigure the propellant manifold system and subsequently jettison the payload(s) as required in order to place the remaining payload(s) in the mission orbit(s).

The system functions described will be confined to the three failure modes described earlier for vehicle 24 for which the payload performances are described in tables 1, 2 and 3, and the weights of the three payloads 105, 106 and 108 are defined in table 4.

Should there be no anomalous operations or benign

TABLE 4

| Failure Mode | Vehicle Performance to GEO (lbs) | Payloads Place in GEO (lbs) | | Payloads Jettisoned |
| --- | --- | --- | --- | --- |
| (1) No Failure | 26,000 | Primary | −14,500 | None |
| | | Secondary | −8,500 | |
| | | Tertiary | −3,000 | |
| (2) One Engine Failed in stage three 32 at lift off | 23,000 | Primary | −14,500 | Tertiary |
| | | Secondary | −8,500 | |
| (3) Stage three 32 fails to thrust at lift off | 14,500 | Primary | −14,500 | Secondary Tertiary | failures, i.e., failure mode one, no vehicle failures, the system will operate in a pre-programmed mode throughout the launch, with all the payloads 105, 106 and 108 placed in their mission orbits successfully.

Should either engine 76 or 78 of stage three 32 fail benignly, the central computer 134 would send a command to close electromagnetic valves 80 and 84, or 82 and 86, stopping propellant flow to the failed engine 76 or 78. Additionally, should anomalous operations occur in either engine 76 or 78 that could be a precursor to a catastrophic failure, the central computer 134 would issue the same commands. The central computer 134 would then reprogram the vehicle 24 launch trajectory to be controlled by the guidance system 136. Subsequently, the timing sequence would be established for the activation of the separation devices on structural attachments 118 and 120 to jettison the tertiary payload 108 at the time of SRMUs 26 and 28 separation. This action would enable the placement of the primary and secondary payloads 105 and 106 in their mission orbits.

Generally, failure in stage subsystems other than the engines 76 or 78 could impact the proper functioning of the entire propulsion system. Accordingly, failures of that nature could lead to the occurrence of failure mode three, failure of stage three, 32 to thrust. Should this occur, the reprogramming by the central computer 134 would be to first shut down both engines 76 and 78 by commanding electromechanical valves 80, 82, 84 and 86 closed. Subsequently, 1) the vehicle trajectory program would be reprogrammed by the central computer 134 to be controlled by the guidance system 136 and 2) the timing sequences would be established to activate the separation devices on the structural attachments 118 and 120 and 122 and 124 to jettison the secondary and tertiary payloads 106 and 108 at time of SRMUs 26 and 28 separation. These actions would enable the placement of the primary payload 105 in its mission orbit.

The launch vehicle 24 can be launched with a primary and secondary payload for different failure modes, e.g. failure modes 2 and 3 illustrated in Tables 2 and 3. In this case a primary payload to be placed in GEO would be associated with the payload performance for failure mode 3, 14,500 lb shown in Table 3. A secondary GEO payload should have a weight of approximately 23,000−14,500=8500 lbs; the difference in payload performances for the two failure modes. The calculated performance for the vehicle 24 launching the primary and secondary payloads with stage three 32 failing at liftoff is 14,700 lb., the same as that shown in Table 3 within the accuracy of the optimization procedures. For this case, the secondary payload was jettisoned at the time of SRMUs 26 and 28 separation assuming the secondary payloads 106 to be mounted and separated as illustrated in FIG. 6. Performance values do not include potential variations due to structural design requirements for additional payload mounting structure and separation devices on stage four 34.

The launch vehicle 24 could be utilized with the same failure modes, 1 and 2 described above to place primary and secondary payloads in different mission orbits, e.g. GEO and LEO. The LEO could be an elliptical orbit of 28.5° inclination with Apogee and perigee of 2 and 80 nautical miles respectively, which is the payload transfer orbit for Space Station Freedom. Referring to Tables 1 and 2, the primary payload would be associated with the second failure mode, an engine-out in stage three 32 at lift off, approximately 23000 lbs to GEO. The vehicle 24 payload performances to the space station freedom transfer orbit, not shown in Tables 1 and 2, are approximately 90,000 and 80,000 pounds. Thus, assuming the secondary payload were placed in the space station transfer orbit its estimated weight would be approximately 90,000−80,000=10,000 lbs. Table 5 presents the vehicle performance data for the failure mode 1, where no vehicle failure occurs. In this case the 10000 lb secondary payload is placed in the space station transfer orbit and the calculated primary payload weight subsequently placed in GEO is 22400 lb.

A second vehicle performance calculation was made assuming the occurence of the second failure mode, one engine failed in stage 32 at lift off. The weights and performance data are the same as that shown in Table 2 except for the increased weight staged at the time of SMRUs 26 and 28 staging, 181,844 Versus 170,844 lbs. The added weight, 11,000 lbs, is due to the jettisoning of the secondary payload 106 and its support and jettisoning structure, in response to the occurence of failure mode 2, as illustrated in FIGS. 6(a), 6(b) and 6(c). The calculated weight of the primary payload 105 for this case is the same as that shown in Table 5, within the accuracy of the calculations.

The failure probabilities for vehicle 24 can be projected from the failure histories of the Titan and Centaur families. Table 6 presents the historical and projected failure ratios for major subsystems for the Titan family. The failures are categorized on the basis of engineering judgement as to whether they would have been catastrophic or benign with respect to causing failures in other subsystems and, therefore, failure of the vehicle. The failures shown do not include failures which are thought to have been fixed by changes in the Titan vehicle design.

TABLE 5

Vehicle 24 GEO Mission Weight and Performance Data With No Vehicle Failure

|  | Burn Times (sec) | | | Weight (lbs) | | Engine Exit (sq. in.) | Vacuum Thrust LBm | Fuel Flow Rate (lb/sec) | Specific Impulse |
|---|---|---|---|---|---|---|---|---|---|
|  | Start | Time | End | Propellant | Total |  |  |  |  |
| Burn |  |  |  |  |  |  |  |  |  |
| 1 | 0 | 115 | 115 | 1323386 | 160844 | 26849 | 3300320 | 11544 | 286 |
|  | 0 | 115 | 115 | 419387 | 0 | 13467 | 1103568 | 3658 | 302 |
| Fairing |  |  | 158 |  | 10592 |  |  |  |  |
| 2 | 115 | 91 | 206 | 333542 | 36722 | 13467 | 1103568 | 3658 | 302 |
| 3 | 206 | 91 | 297 | 166771 | 10752 | 6733 | 5511784 | 1829 | 302 |
| 4 | 297 | 284 | 581 | 42032 | 10000[1] | 2513 | 68000 | 148 | 460 |
| 5 | 581 | 392 | 973 | 57968 | 13360 | 2513 | 68000 | 148 | 460 |

| Liftoff | lbs. |
|---|---|
| Thrust | 3809187 |
| Gross Weight | 2602815 |
| Secondary Payload to LEO[1] | 10000 |
| Primary Payload to GEO | 22400 |

TABLE 6

Titan Family History and Projections (149 Titan Launches)

| | | Failure History | | | |
|---|---|---|---|---|---|
| | | | History | Projected | |
| | Number of Failures | Per vehicle | Per Engine | Per Engine | Per Stage With Two Engines |
| Benign Failures | | | | | |
| Liquid Propulsion | 2.5 | 0.017 | 0.006 | 0.006 | 0.012 |
| Other | 0 | 0 | 0 | — | 0.005 |
| Catastrophic Failures | | | | | |
| Solid Propulsion | 1 | — | 0.013 | 0.0065 | 0.005 | 0.010 |
| (77 Launches) | | | | | |
| Liquid Propulsion | 0.5 | 0.003 | 0.001 | 0.001 | 0.002 |

TABLE 6-continued

Titan Family History and Projections
(149 Titan Launches)

| Other | 0 | 0 | 0 | 0 | 0 |
|---|---|---|---|---|---|

Postulated Manifold Subsystem Failure Ratios Per Stage

| Benign | 0.002 |
|---|---|
| Catastrophic | 0.001 |

The 2.5 and 0.5 benign and catastrophic propulsion failures are derived from 3 failures, one of which is judged to be equally probable of being benign or catastrophic. Although the Titan experienced no benign failures of other subsystems, the projection of 0.005 is based upon the history of all U.S. launch vehicles.

Shown also are the postulated failure probabilities for the interstage propellant transfer manifold for which there is no launch history. The assigned values are thought to be conservative estimates based upon the similarity between the manifold system and the propellant transfer systems between stage tanks and engines.

The failure history for Centaur is 2 propulsion system failures in 67 trials, not including design failures, yielding a failure ratio of 0.03. Since any failure in Centaur will lead to a mission failure, there is no necessity to differentiate between catastrophic and benign failures.

In general, it can be shown that, for sufficiently small probabilities, the failure ratio (probability) of a system can be approximated by adding the failure ratios of its subsystems. This technique will be utilized, where appropriate, in this analysis. Also, since the launch vehicle 24 has capabilities to meet mission requirements with one liquid engine or stage failed benignly, probabilities of two or more failures of N units must be projected. The general expression for that probability ($P_{N,2}$) is given by equation 1.

$$P_{N,2} = 1 - (1-BFP)^N - N(BFP)(1-BFP)^{N-1} \quad (1)$$

where BFP is the benign failure probability of the liquid engine or stage, as the case may be.

Table 7 presents the projected vehicle 24 failure probabilities for the three specified failure modes, for which the vehicle performances are presented in table 1, 2 and 3. Assuming that vehicle 24 were launched with the primary, secondary and tertiary payloads defined in table 4, the projected probabilities for the three payloads are shown in Table 8.

For the tertiary payload to be placed in orbit, no failure can occur in the vehicle. Thus, if any benign failure occurred, probability 0.038, it would be jettisoned. The expected number of launches between benign failures is the reciprocal of the benign failure, 26. Additionally, the tertiary payload would fail to reach its mission orbit if the vehicle failed catastrophically. Thus, the total probability of mission failure for the tertiary payload is 0.038+0.016+0.030=0.084 with an expected number of launches between failures of 12. As would be expected, lower failure probabilities are projected for the secondary payload since it would be placed in orbit in spite of an engine failing benignly at lift off. Finally, the primary payload would fail to be placed in orbit only if more than two engines or the manifold failed benignly at lift off or the vehicle failed catastrophically. Utilizing equation 1, it can be shown that the probability of the former event is approximately zero. Thus, the probability of the primary payload not being placed in its mission orbit is reduced to the probability that the manifold will fail benignly or the vehicle will fail catastrophically.

Another embodiment of the current invention is a launch vehicle having the same number of stages and characteristics of vehicle 24 utilizing modified Atlas II stages instead of

TABLE 7

Projected Vehicle 24 Failure Probabilities

| Titan Stages | 1) No vehicle failure | 2) One engine fails in stage two 30 or three 32 at liftoff | 3) Stage two 30 or three 32 fails to thrust at liftoff |
|---|---|---|---|
| | Specified Benign Failure Modes | | |
| Liquid propulsion | 2(0.012) | 0 | — |
| Manifold | 2(0.002) | 2(0.002) | 2(0.002) |
| Other | 2(0.005) | 2(0.005) | — |
| Total Benign | 0.038 | 0.014 | 0.004 |
| | Catastrophic Failure Modes | | |
| Solid propulsion | 0.010 | 0.010 | 0.010 |
| Liquid propulsion | 2(0.002) | 2(0.002) | 2(0.002) |
| Manifold | 2(0.001) | 2(0.001) | 2(0.001) |
| Total Catastrophic | 0.016 | 0.016 | 0.016 |
| Centaur Stage | 0.030 | 0.030 | 0.030 |
| Total Vehicle | 0.084 | 0.060 | 0.050 |

TABLE 8

Vehicle 24 Three - Payload Launch Event
Probabilities/Expected Number of Launches Between Events

| | Jettisoning | Failure to Reach Mission Orbit |
|---|---|---|
| Tertiary Payload | 0.038/26 | 0.084/12 |
| Secondary Payload | 0.014/71 | 0.060/17 |
| Primary Payload | — | 0.050/20 |

Titan stages. Each Atlas stage has three engines; two booster engines and one sustainer engine. Such a vehicle would present the possibility of three benign failure modes in a stage; one, two or three engines.

In general, it will be appreciated that: 1) the weight of the secondary payload can be increased at the expense of reducing the weight of the primary payload to the point that the latter reaches zero and the former equals the vehicle performance capability associated with the failure mode, 2) any launch vehicle with specified benign failure modes and different associated performances has the capability of launching a primary and secondary payloads; 3) depending upon the number of failure modes and their associated performance differences, there may be several payloads; 4) payloads may be placed in different mission orbits; and 5) the probabilities of failure to place the different payloads in their mission orbits will be different.

Further features and advantages provided by the present invention will be appreciated by those skilled in the art. Furthermore, it will be appreciated that a large number of variations may be provided from the preferred embodiments of the present invention described above while remaining within the scope of the present invention.

What is claimed is:

1. A launch vehicle, comprising:
   a payload having a plurality of discrete separable subpayloads;
   a plurality of thruster engines, said plurality of thruster engines having a combined thrust and propellant capacity to lift said payload into orbit for a nominal launch; and
   means for jettisoning one of said plurality of subpayloads in response to a detected non-nominal condition in the form of a benign failure in one of said thruster engines.

2. A launch vehicle as set out in claim 1, wherein said means for jettisoning includes means for receiving a signal from ground based flight monitoring equipment and personnel which detect said benign failure in one of said thruster engines.

3. A launch vehicle as set out in claim 1, further comprising means for monitoring the in flight operation of said thruster engines and, upon detection of a benign failure in one of said thruster engines, providing a failure detection signal to said means for jettisoning.

4. A launch vehicle as set out in claim 1, further comprising means, responsive to a failure in a second thruster engine, for jettisoning a second of said plurality of subpayloads.

5. A launch vehicle as set out in claim 1, wherein said thruster engines include solid rocket motors and liquid propellant burning engines configured to burn in parallel at lift-off.

6. A launch vehicle as set out in claim 1, wherein said means for jettisoning comprises explosive bolts coupling said subpayload to said launch vehicle and means for receiving a failure detection signal and triggering said explosive bolts in response thereto.

7. A launch vehicle as set out in claim 6, wherein said means for jettisoning further comprises one or more separation rockets attached to said subpayload.

8. A multi-stage launch vehicle, comprising:
   a plurality of thruster stages including:
   a first rocket engine having a first thrust and propellant capacity; and
   a second rocket engine having a second thrust and propellant capacity;
   wherein said thruster stages have a combined performance capability of placing a first weight into a desired orbit during a nominal launch and a second reduced performance capability of placing a second weight into orbit if one of said rocket engines fails;
   a first payload, configured on one of said plurality of thruster stages, having a weight approximately equal to said second reduced performance capability weight;
   a second payload having a weight approximately equal to the difference between said first performance capability weight and said second reduced performance capability weight; and
   means for jettisoning said second payload in response to a non-nominal condition in the form of a benign failure in one of said first or said second engines.

9. A multi-stage launch vehicle as set out in claim 8, wherein said second payload is configured on top of said first payload.

10. A multi-stage launch vehicle as set out in claim 8, wherein said second payload is mounted on a second one of said plurality of stages.

11. A multi-stage launch vehicle as set out in claim 8, wherein said first and second rocket engine thrusts are equal.

12. A multi-stage launch vehicle as set out in claim 8, wherein said first and second rocket engines are liquid propellant burning rocket engines and wherein said plurality of thruster stages further comprises one or more solid rocket engines.

13. A multi-stage launch vehicle as set out in claim 8, wherein said first and second rocket engines are configured in the same stage.

14. A multi-stage launch vehicle, comprising:
   a plurality of thruster stages including:
   a first rocket engine having a first thrust and propellant capability;
   a second rocket engine having a second thrust and propellant capability;
   a third rocket engine having a third thrust and propellant capability;
   wherein said thruster stages have a combined performance capability of placing a first weight into a desired orbit during a nominal launch, a second reduced performance capability of placing a second weight into orbit if one of said rocket engines fails, and a third reduced performance capability of placing a third weight into orbit if two of said rocket engines fail and wherein said launch vehicle further comprises:
   a first payload having a weight approximately equal to the vehicle performance capability weight if any two of said engines fail;
   a second payload having a weight equal to the difference between the vehicle performance capability weight with one engine failure and two engine failures;
   a third payload having a weight equal to the difference between the vehicle performance capability weights with no engine failures and one engine failure;
   means for jettisoning said third payload in response to a benign failure of one of said first, second or third engines; and
   means for jettisoning said second and third payloads in response to a benign failure of any two of said engines.

15. A multi-stage launch vehicle as set out in claim 14, wherein said first, second and third payloads are mounted on different stages.

16. A multi-stage launch vehicle, comprising:
   a first stage having first and second solid rocket motors configured to burn in parallel;

a second stage having liquid propellant burning engines, configured to burn in parallel with said first stage;
a third stage, having liquid propellant burning engines configured to burn in parallel with said first and second stages;
a fourth stage, having liquid propellant burning engines configured on top of said third stage so as to burn in series with said third stage;
a first payload mounted on said first solid rocket motor and releasably coupled to said fourth stage;
a second payload mounted on said second solid rocket motor and releasably coupled to said fourth stage; and
a third payload mounted on said fourth stage.

17. A multi-stage launch vehicle as set out in claim 16, further comprising means for jettisoning said first payload in response to detection of a first failure mode in one of said stages.

18. A multi-stage launch vehicle as set out in claim 17, wherein said means for jettisoning is an explosive coupling device.

19. A multi-stage launch vehicle as set out in claim 17, further comprising means for jettisoning said first and second payloads in response to detection of a second failure mode in one of said stages.

20. A multi-stage launch vehicle as set out in claim 19, wherein the launch vehicle has a payload performance capability of approximately 26,000 lbs to Earth orbit during a launch with no failures, a performance capability of 23,000 lbs in said first failure mode, and a performance capability of 14,500 lbs in said second failure mode, and wherein said first payload has a weight of approximately 3,000 lbs, said second payload has a weight of approximately 8,500 lbs and said third payload has a weight of approximately 14,500 lbs.

21. A multi-stage launch vehicle, comprising:
a first stage having first and second solid rocket motors configured to burn in parallel;
a second stage having liquid propellant burning engines, configured to burn in parallel with said first stage;
a third stage, having liquid propellant burning engines configured to burn in parallel with said first and second stages;
a fourth stage, having liquid propellant burning engines configured on top of said third stage so as to burn in series with said third stage;
a first payload mounted on said fourth stage;
a second payload configured on said first payload; and
means for jettisoning said second payload in response to a detection of a first failure mode in one of said launch vehicle stages.

22. A multi-stage launch vehicle as set out in claim 21, further comprising means for transferring propellant between said second and third stages.

23. A multi-stage launch vehicle as set out in claim 21, wherein the weight of said second payload is approximately equal to the difference in the launch vehicle performance capability with no failures in the stages and in said first failure mode.

24. A multi-stage launch vehicle as set out in claim 23, wherein the weight of said second payload is approximately 3,000 lbs.

25. A multi-stage launch vehicle as set out in claim 21, wherein said first failure mode is a failure of an entire stage to thrust.

26. A multi-stage launch vehicle as set out in claim 21, wherein said first failure mode is the failure of a single engine in one of said stages to thrust.

27. A launch vehicle, comprising:
a plurality of thruster stages, each having one or more engines, said plurality of thruster stages having a combined thrust and propellant capacity to lift a first payload weight and a second payload weight into orbit for a nominal launch and reduced capacity sufficient to lift only said first payload weight into orbit upon occurrence of a first specified nonnominal condition in the form of a benign failure mode;
first payload having a first weight mounted on one of said thruster stages;
a second payload having a second payload weight;
means for monitoring the performance of one or more of said thruster stages for indications of said specified benign failure mode; and
means, responsive to said means for monitoring, for jettisoning said second payload in response to detection of said specified benign failure mode by said means for monitoring.

28. A launch vehicle as set out in claim 27, wherein said means for monitoring comprises:
means for sensing a plurality of launch vehicle subsystems and providing a plurality of status signals indicating the status of said subsystems; and
control means, coupled to said means for sensing, for monitoring the plurality of status signals and comparing them to nominal values for said subsystems, and, in response to a detected deviation from said nominal values corresponding to said specified benign failure mode, providing a payload jettison command.

29. A launch vehicle as set out in claim 28, wherein said control means comprises a computer and wherein said computer includes means for reprogramming the launch vehicle flight trajectory in response to said detected benign failure mode.

30. A launch vehicle as set out in claim 28, wherein said plurality of launch vehicle stages includes one or more liquid propellant burning stages having propellant tanks and propellant feed lines and wherein said means for sensing comprises:
means for monitoring power supplies in one or more of said stages;
means for monitoring avionics;
means for monitoring propellant tank pressures in one or more of said liquid propellant burning stages; and
means for monitoring one or more of said engines.

31. A launch vehicle as set out in claim 30, wherein said means for monitoring power supplies comprises means for monitoring power supply voltages, currents and temperatures.

32. A launch vehicle as set out in claim 30, wherein said means for monitoring avionics comprises means for monitoring avionics voltages and currents.

33. A launch vehicle as set out in claim 30, wherein said means for monitoring said engines comprises means for monitoring engine pressures, temperatures and vibrations.

34. A launch vehicle, comprising:
a plurality of thruster stages, each having one or more engines, said plurality of thruster stages having a combined thrust and propellant capacity to lift a first payload weight into orbit for a nominal launch and reduced capacity sufficient to lift a second lower payload weight into orbit upon occurrence of a first specified non-nominal condition in the form of a benign failure mode;

a first payload mounted on a final one of said stages;

a second payload having a second payload weight configured on top of said first payload;

means for releasably coupling said second payload to said launch vehicle; and means for jettisoning said second payload in response to detection of said specified benign failure mode.

35. A launch vehicle as set out in claim 34, wherein said means for releasably coupling said second payload to said first payload comprises:

a multiple sector mounting structure attached to the second payload and attached to an upper portion of said last stage; and a plurality of separation mechanisms for separating said mounting structure from said last stage.

36. A launch vehicle as set out in claim 35, wherein said separation mechanisms are explosive bolts.

37. A launch vehicle as set out in claim 35, wherein said mounting structure is a tri-sector cylindrical structure extending from said upper portion of said last stage to above said first payload so as to enclose said first payload.

38. A launch vehicle as set out in claim 37, wherein said mounting structure further comprises a sector separation device on each sector thereof for separating said sector from around said first payload.

39. A launch vehicle as set out in claim 37, wherein said mounting structure further comprises a support ring on the upper portion thereof for supporting said second payload above said first payload.

40. A launch vehicle as set out in claim 39, further comprising a structural element coupled to a side portion of said second payload and to said support ring.

41. A launch vehicle as set out in claim 40, further comprising one or more separation rockets attached to said structural element.

* * * * *